United States Patent [19]

Adler

[11] Patent Number: 4,616,167

[45] Date of Patent: Oct. 7, 1986

[54] ELECTRONIC APPARATUS

[76] Inventor: Karl Adler, Dorfstrasse 41, 2545 Selzach, Switzerland

[21] Appl. No.: 475,165

[22] PCT Filed: Jul. 13, 1981

[86] PCT No.: PCT/CH81/00078

§ 371 Date: Mar. 14, 1983

§ 102(e) Date: Mar. 14, 1983

[87] PCT Pub. No.: WO83/00237

PCT Pub. Date: Jan. 20, 1983

[51] Int. Cl.[4] .................. G04C 10/00; G04G 1/00; H02J 7/00

[52] U.S. Cl. .................. 320/1; 363/62; 368/204

[58] Field of Search .................. 320/13, 14, 1; 368/203-205, 159; 363/62

[56] References Cited

U.S. PATENT DOCUMENTS

| | | | |
|---|---|---|---|
| 3,660,163 | 5/1972 | Moser | 429/191 |
| 3,674,562 | 1/1971 | Schneider et al. | 429/192 |
| 3,723,183 | 2/1971 | Greatbatch | 429/185 |
| 3,999,368 | 12/1976 | Yoshida | 368/159 |
| 4,397,563 | 8/1983 | Ichinose | 368/204 |
| 4,404,624 | 9/1983 | Yamazaki | 368/204 X |
| 4,485,432 | 11/1984 | Kidena et al. | 368/204 X |

FOREIGN PATENT DOCUMENTS

| | | |
|---|---|---|
| 2119707 | of 0000 | Fed. Rep. of Germany . |
| 3032896 | of 0000 | Fed. Rep. of Germany . |
| 7597/75 | of 0000 | Switzerland . |

OTHER PUBLICATIONS

Patents Abstracts of Japan, Band 1, No. 57, Seit 3790E76, Jun. 3, 1977 & Up, A, 51-151578, Dec. 27, 1976.

Patents Abstracts of Japan, Band 2, No. 147, Seite 9346E78, Dec. 8, 1978 & JP, A, 53-115269, Oct. 7, 1978.

Patents Abstracts of Japan, Band 4, No. 11, Seite 156E168, Jan. 26, 1980 & JP, A, 54-153068, Dec. 1, 1979.

*Primary Examiner*—R. J. Hickey

*Attorney, Agent, or Firm*—Wender Murase & White

[57] ABSTRACT

A power supply for small integrated circuit devices which utilize a nominal supply voltage of 1.5 V but which are energized by a long-life lithium-iodine battery having a terminal voltage of 2.8 V. The power supply reduces the voltage to the integrated circuit to the required 1.5 V and also provides a means for delivering current peaks to a device operated by the integrated circuit, such as a stepping motor or LED display, while maintaining a relatively constant supply voltage to the integrated circuit.

15 Claims, 3 Drawing Figures

ELECTRONIC APPARATUS

The present invention relates to an electronic apparatus, and more specifically a small portable apparatus having a long life solid state battery, more particularly still to a lithium-iodine battery, an integrated circuit and either a liquid crystal display, a light emitting diode display or a motor driven analog display. An advantage of such apparatus is that they work for example up to 10 years without changing the battery. However, in order to attain even small dimensions the power supply circuit must be optimalized. The internal resistance of the batteries is relatively high so that they cannot directly deliver current peaks such as those which occur during switching processes and more particularly during the driving pulses of a stepping motor or during intermittent switching on of a light emitting diode, without requiring a prohibitive increase of the active surface of the battery.

It is known that long life solid state batteries have a voltage of 2.8 V and a characteristic of voltage which depends on the ratio of the internal resistance to the load resistance. The internal resistance is very high to prevent self discharge which is a decisive feature of these batteries. The most favourable practical resistance lies at about 50 kOhm. With regard to this point, reference is made to the indications of the manufacturing company Catalyst Research Corp. and its U.S. Pat. Nos. 3,660,163, 3,674,562 and 3,723,183.

It is well known that the kind of integrated circuit manufacturing which is the most favorable of practical use in the above, the working voltage is about 1.5 V. The average operating current for the applications mentioned alone lies at about 2–5 $\mu$A so that with a capacity after battery of 300–400 mAh, a service life of more than 10 years may be realized. Although the functions of integrated circuits does not change at higher voltages, one obtain a very high increase in current higher voltages, up to 50 uA which practically obviates the utilization of long life batteries.

A lay out of an integrated circuit for an operating voltage of 2.8 V would lead to the further disadvantage that all production lines for calculators or watches would have to be modified and further that the quality would decrease. Further a separate function would become necessary for those types of integrated circuits which presuppose a relatively small internal resistance power supply such as conventional batteries, as opposed to a lithium-iodine battery with solid electrolyte. Because of the above indicated reasons, so called long life batteries are not capable of practical use in the above mentioned applications. In order to avoid misunderstanding it is further mentioned that lithium-iodine batteries with liquid electrolyte are also available. They have a unique capability to deliver very great amounts of energy for short periods of time. However like all batteries with liquid electrolyte, they share the disadvantage of a short service life.

The object of the present invention is to facilitate a breakthrough in the utilization of long life solid state batteries such as for example lithium-iodine batteries, for electronic small apparatus like calculators or watches.

The electronic apparatus according to the present invention is characterized in that power is supplied at least for integrated circuits through a resistor having a voltage drop of at least about 1.3 V and in that a capacitor, having a capacity of 5 to 10 $\mu$F, is provided for delivering peaks of current. This provides an adaptation of the voltage of the battery to the voltage of the integrated circuit and the peaks of current are delivered by the capacitor in such a way that no breakdown of the voltage at the integrated circuit and no disturbing of the function of the latter will occur. It is known that the internal resistance increases in accordance with the discharge time of the battery. Nevertheless, in order to provide a constant operating voltage, at least for integrated circuits it is preferable to choose a resistance having a value many times greater than the internal resistance of the battery. Particularly under such circumstances, it is important to hold the current through the resistance at a relatively constant average value in order to avoid excessive variations in the load voltage, for example, the voltage across an integrated circuit.

BRIEF DESCRIPTION OF THE DRAWINGS

An example of an embodiment of an electronic apparatus according to the present invention will be described further with the help of the accompanying drawing.

DETAILED DESCRIPTION OF A PREFERRED EMBODIMENT

Figure 1:
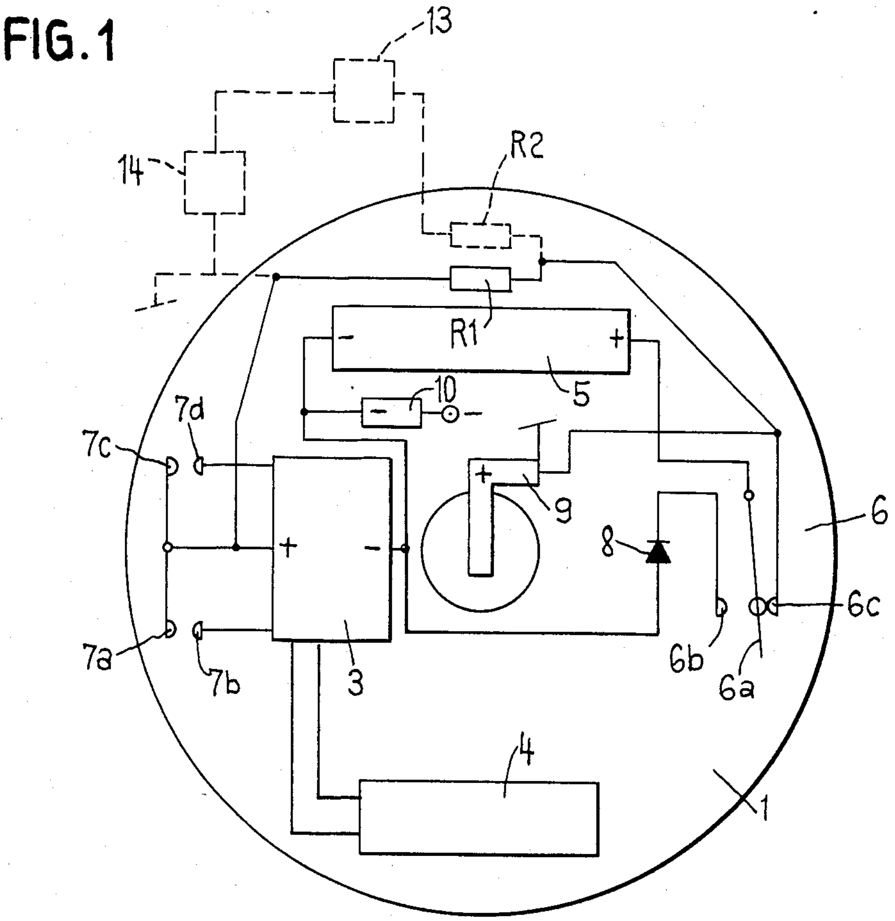
FIG. 1 shows a schematic top view of a module of the apparatus with an execution's variant.
Figure 2:
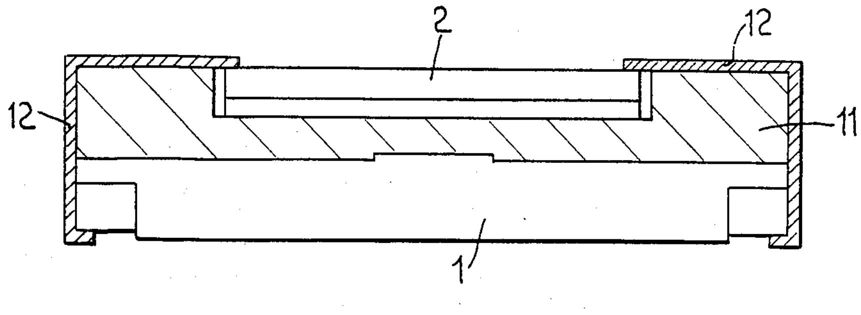
FIG. 2 shows a schematic section of the module.

The module represented in FIGS. 1 and 2 comprises a flat lithium-iodine battery 1 above which is disposed a display unit 2 not represented in FIG. 1. The switching elements, more particularly an integrated circuit 3, an oscillating quartz crystal 4, a capacitor 5, two resistances R1 and R2, a change-over switch 6 with contacts 6*a*, 6*b* and 6*c*, a control switch 7 with contacts 7*a* to 7*d* and a light emitting diode 8 are disposed between the battery 1 and display unit 2. The elements are connected together as indicated in FIG. 1, contacts 9 and 10 being connected with the positive, and negative terminals of the battery 1. A hold-fast 11 supports the switching elements and the module is held together by means of a profile ring 12.

An embodiment variant is indicated by the broken lines in FIG. 1, and comprises a stepping motor 13 having a corresponding integrated circuit 14, instead of a liquid crystal display or the light emitting diode display 2 in accordance with FIG. 2.

In the represented rest condition the integrated circuit is fed by the positive terminal of the battery through the resistor R1 which produces a voltage drop of 1.3 V. At the same time the capacitor 5 is charged through the closed contacts 6*a* and 6*c*. In order to activate the display, represented schematically by the diode 8 in FIG. 1, the contact 6*a* is turned over to contact 6*b* by a pusher (not illustrated whereby the display 8 is energized by the capacitor long enough to permit reading of it. The battery is therefore not loaded by the relatively high current demands of the display so that practically no variation in the voltage of the integrated circuit occurs which could produce a misfunction of the latter. The contacts 7*a* and/or 7*c* may be activated by a pusher (not illustrated) so that control pulses can be delivered over the contacts 7*b* 7*d* respectively to control inputs of the integrated circuit 3.

Turning to the variant embodiment, the resistor R2, having a value of between about 250 and 500 Ohms, is connected in the driving circuit of the stepping motor 13. In this embodiment driving pulses are delivered from the capacitor 5 to the stepping motor 13 and experience has shown that according to the type of the motor reliable operation is guaranteed by a capacitor of 5 to 10 μF. Such a capacitor occupies very little space and it can be practically in any small apparatus e.g. electronic wristwatches. The integrated circuit 14 is laid out for the full battery voltage of 2.8 V.

In the embodiment having light emitting diodes 8, the circuit can also be executed so that during the switching on of the display the effective resistance (R1) is decreased by providing a bridging resistor connected in parallel with R1 by means of a switch operated together with the control switch for the display. In this case the resistance R1 may have a value of e.g. 300 kOhm while the bridging resistance has a value of 150 kOhm.

Figure 3:
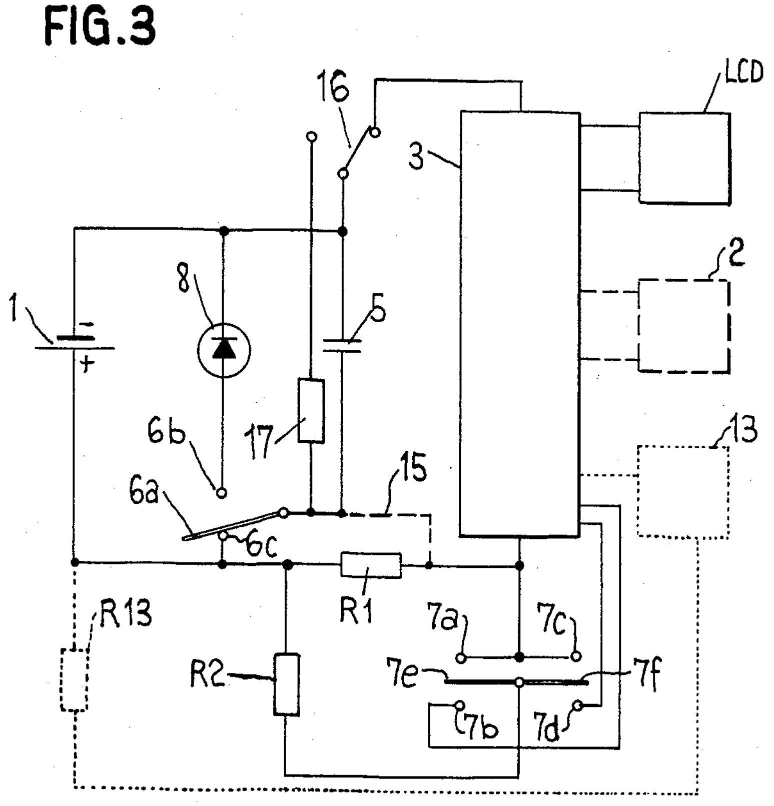
FIG. 3 shows the diagram of connections.

In FIG. 3, corresponding parts have the same references numerals as in FIG. 1 and only one integrated circuit 3 is shown which can drive either a liquid crystal display (LCD), a light emitting diodes display 2 (LED) or a stepping motor 13 as represented schematically. In FIG. 3 additional intermediate contacts *7e* and *7f* of the switch 7 which are connected with the battery 1 through the resistor R2. As indicated by a dashed line in FIG. 3, the resistor R2, in case of a light emitting diodes display 2, is connected to the contacts *7e* and *7f* and it has e.g. the above mentioned value of 150 kOhm. A resistor R13 is connected in series with the stepping motor 13 and has a value of e.g. about 250 to 500 Ohm. As already mentioned, when one of the switches *7a* or *7c* is activated, current is supplied to the integrated circuit 3 through the resistance R2 of decreased value for eliminating the influence of a voltage drop in the capacitor 5. In the case of the liquid crystal display (LCD) and in the case of the stepping motor 13 which receives very short driving pulses such measures are not necessay.

The volume of the battery, of either form inclusive a protective cap amounts to e.g. 1.2 $cm^3$ for a capacity of 350 mAh. For a maximum consumption of $4 \cdot 10^{-6}$ A, one obtains a service life of about 10 years.

The diameter of the battery in FIGS. 1 and 2 amounts to e.g. 25 mm and the height to 2.5 mm. A corresponding flat battery has e.g. a height of 3 mm and a surface of 22×17 mm.

The module according to FIGS. 1 and 2 comprises e.g. a total height of 6.7 mm and a diameter of 30 mm.

As already indicated, FIG. 3 is also a schematic representation. Normally the driving pulses for the stepping motor 13 are delivered by the integrated circuit 3. Due to the fact that relative high peaks of current cannot occur through the relative high resistance R1, the capacitor 5 is directly connected to the supply terminals of the integrated circuit as indicated by the dashed line 15 in FIG. 3. In this case the resistance R1 is connected between the battery 1 and the capacitor 5. In this case the contact *6c* is no longer necessary and the resistors R2 or R13, whenever present, are directly connected to the capacitor 5.

As indicated in FIG. 3, a change over switch 16 may be provided for separating the load from the capacitor 5. The capacitor is then connected to a resistor 17 the value of which is selected so that the voltage across the capacitor is held to the desired nominal voltage value of 1.5 V.

What I claim:

1. An electronic apparatus energized by a long-life solid state battery having a battery voltage comprising a first voltage level, said electronic apparatus comprising an integrated circuit operable to be powered at a second voltage level lower than said first voltage level, and a load controlled by said integrated circuit, a power supply circuit connected between the battery and the integrated circuit comprising a resistance for dropping the first voltage level to the second voltage level, and a capacitor having a capacity of 5 to 10 μf for delivering peaks of current to the load.

2. The apparatus according to claim 1, wherein said battery has an internal resistance and the resistance of the power supply circuit has a value which is a multiple of the internal resistance of the battery.

3. The apparatus according to claim 1 or 2, wherein the battery has an internal resistance of on the order of 50 kOhm, the resistance of the power supply circuit has a value of on the order of 300 kOhm.

4. The apparatus according to claim 1 or 2 wherein the capacitor is charged to the battery voltage and further comprising means, connected to the capacitor, for delivering said current peaks to the load.

5. The apparatus according to claim 1 or 2 further comprising a switch between the capacitor and load, said switch being operable for extracting current peaks from the capacitor.

6. The apparatus according to claim 1 or 2 further comprising a switch means for decreasing the value of the resistance of the power supply circuit during the occurence of current peaks.

7. The apparatus according to claim 6, wherein said switch means comprises a control switch having contacts for the changing the resistance of the power supply circuit.

8. The apparatus according to claim 1, wherein the integrated circuit has supply terminals and the capacitor is connected to the supply terminals and the resistance is connected between the battery and the capacitor.

9. The apparatus according to claim 4 further comprising a switch between the capacitor and load, said switch being operable for extracting current peaks from the capacitor.

10. The apparatus according to claim 5 further comprising characterized a switch means for decreasing the value of the resistance of the power supply circuit during the occurrence of current peaks.

11. The apparatus according to claim 1 wherein the first voltage level is on the order of 2.8 V and the second voltage level is on the order of 1.5 V.

12. An electronic apparatus adapted to be energized by a long-life lithium-iodine battery having an internal resistance and a battery voltage level, said apparatus including an integrated circuit operable to be powered at an operating voltage level lower than battery voltage level, a load controlled by said integrated circuit and a resistance connected between said battery and said integrated circuit, said resistance having a value substantially larger than the internal resistance of the battery and operable for producing a voltage drop equal to said battery voltage level minus said operating voltage level, and a capacitor of 5 to 10 μf connected in parallel with the battery and operable for delivering current peaks to the load.

13. The apparatus of claim 12 wherein said voltage drop is on the order of 1.3 V.

14. An electronic apparatus adapted to be energized by a long-life lithium-iodine battery having an internal resistance and a battery voltage level, said apparatus including an integrated circuit operable to be powered at an operating voltage level lower than battery voltage level, a load controlled by said integrated circuit and a resistance connected between said battery and said integrated circuit, said resistance having a value substantially larger than the internal resistance of the battery and operable for producing a voltage drop equal to said battery voltage level, minus said operating voltage level, and a capacitor of 5 to 10 μf connected in parallel with the integrated circuit and operable for delivering current peaks to the load.

15. The apparatus of claim 14 wherein said voltage drop is on the order of 1.3 V.

* * * * *